United States Patent
Kupsh

(10) Patent No.: US 7,103,372 B1
(45) Date of Patent: Sep. 5, 2006

(54) SYSTEM AND METHOD FOR PREVENTING DELIVERY OF UNSOLICITED MESSAGES ON AN SMS NETWORK

(75) Inventor: Jerry Kupsh, Concord, CA (US)

(73) Assignee: Cellco Partnership, Bedminster, NJ (US)

( * ) Notice: Subject to any disclaimer, the term of this patent is extended or adjusted under 35 U.S.C. 154(b) by 412 days.

(21) Appl. No.: 10/074,585

(22) Filed: Feb. 12, 2002

(51) Int. Cl.
*H04Q 7/20* (2006.01)

(52) U.S. Cl. .................... 455/466; 455/414; 455/445; 455/412; 370/278; 370/328

(58) Field of Classification Search ............... 455/466, 455/414, 445, 412, 560; 370/228, 328, 278
See application file for complete search history.

(56) References Cited

U.S. PATENT DOCUMENTS

| | | | | |
|---|---|---|---|---|
| 6,101,393 A | * | 8/2000 | Alperovich et al. | 455/466 |
| 2001/0051528 A1 | * | 12/2001 | Lielbriedis | 455/466 |
| 2002/0087584 A1 | * | 7/2002 | Hung | 707/200 |
| 2003/0083078 A1 | * | 5/2003 | Allison et al. | 455/466 |
| 2004/0058694 A1 | * | 3/2004 | Mendiola et al. | 455/466 |
| 2004/0082347 A1 | * | 4/2004 | Alminana et al. | 455/466 |

OTHER PUBLICATIONS

Short Message Peer to Peer Protocol Specification v3.4; Document Version:-Oct. 12, 1999, Issue 1.2 pp. 1-169.

* cited by examiner

*Primary Examiner*—Joseph Feild
*Assistant Examiner*—Julio Perez
(74) *Attorney, Agent, or Firm*—Darby & Darby

(57) ABSTRACT

A method and system for preventing delivery of unsolicited, e.g., "spam," SMS messages. The system and method operate to: 1) receive an SMS message destined for an end user; 2) determine that one or more telephone numbers are associated with the SMS message; 3) compare the one or more telephone numbers to a plurality of predetermined telephone numbers; and 4) prevent delivery of the SMS message if any of the one or more telephone numbers associated with the SMS message matches any of the plurality of predefined telephone numbers. The predefined telephone numbers may be included in the text of the SMS message or in the "callback_num" parameter of the SMS message.

10 Claims, 4 Drawing Sheets

SYSTEM AND METHOD FOR PREVENTING DELIVERY OF UNSOLICITED MESSAGES ON AN SMS NETWORK

FIELD OF INVENTION

The present invention relates to mobile messaging. More particularly, the present invention relates to a system and method for preventing delivery of unsolicited messages on an SMS network.

BACKGROUND

Mobile messaging is a widely utilized form of communication that continues to gain in popularity. One form of mobile messaging, the short message service (SMS), has particularly contributed to rapid deployment of mobile messaging over wireless networks. SMS messaging is known in the art and is defined in EIA/TIA IS-637 versions A and B, which are hereby incorporated herein by reference in their entirety.

As with many other forms of electronic communications, mobile messaging has come to be abused by certain users of the SMS network. As explained below, spamming, i.e., the mass distribution of unsolicited communications, is of particular concern in SMS messaging.

SMS attempts to mimic real-time communications by sending a message to an intended destination as quickly as possible over the SMS network. The delivery time of SMS messaging is adversely affected by spamming because the large quantity of messages that may be associated with a single spamming event absorbs limited and valuable SMS network resources.

Moreover, most SMS messaging services charge a per-use fee, e.g., 2 cents, to a user for every message received. Thus, a recipient of a spam message will incur a cost for receiving messages the user does not want.

A common method of protecting against spamming, namely, blocking messages based on the identification of the sender, is of limited use in SMS messaging because SMS messages may be sent from an e-mail account. To circumvent such a blocking system, a spammer may easily avoid detection by simply changing his e-mail account periodically, thus effectively hiding his identity. This technique can be utilized repeatedly by a spammer because it is simple to implement and has no associated real costs when free e-mail services, e.g., Yahoo!® or Hot Mail® are utilized.

Spamming is often times used as a form of mass marketing and advertising of a particular product or service. As such, it is common for many SMS spammers to include telephone numbers with their spam messages. This feature is particularly conducive to SMS messaging because in SMS messaging a call-back number may be associated with an SMS message. Using a call-back number, a recipient of the message may dial the call-back number by simply pressing one or two buttons on their handset in order to find out more information concerning the advertised product or service. Alternately, a telephone number may be included in the text of the SMS message.

What is desired, and has heretofore been unavailable, is an effective system and method for preventing spam SMS messages from being delivered to an SMS-capable mobile devices by more accurately identifying the spam messages.

SUMMARY

The present system and method address the above-described needs by preventing delivery of SMS spam messages. The method includes the steps of: 1) receiving an SMS message destined for an end user; 2) determining that one or more telephone numbers are associated with the SMS message; 3) comparing the one or more telephone numbers to a plurality of predefined telephone numbers, and 4) preventing delivery of the SMS message if any of the one or more telephone numbers associated with the SMS message matches any of the plurality of predefined telephone numbers. The telephone number associated with the SMS message may be included in the text of the SMS message or in the "callback_num" parameter of the SMS message.

A system for preventing the delivery of spam SMS messages according to the present invention includes: 1) one or more network processing devices; and 2) a list of predefined telephone numbers. The one or more network processing devices: a) receive data from a sending device, the received data including a message destined for the intended SMS receiving device; b) extract one or more telephone numbers from the received data; c) compare the extracted one or more telephone numbers to the list of predefined telephone numbers; and d) prevent delivery of the message to an intended SMS receiving device if any of the one or more telephone numbers matches any of the telephone numbers in the list of predefined telephone numbers. A short message service center (SMSC) may perform the operation of the processing devices in conjunction with a database that stores the list of predefined telephone numbers.

BRIEF DESCRIPTION OF THE DRAWINGS

The foregoing and other features of the present invention will be more readily apparent from the following detailed description and drawings of an illustrative embodiment of the invention in which.

DETAILED DESCRIPTION OF AN EMBODIMENT OF THE INVENTION

The system and method of the present invention utilize the telephone number associated with a spam SMS message to prevent delivery of the message to an SMS-capable mobile device. In general, a spam message is a message which is sent to a number of users, many of which do not desire to receive the message. Accordingly, as used herein, a spam message refers to an unsolicited message containing advertising or related material that is sent to a plurality of intended SMS-capable mobile device recipients.

Figure 1:
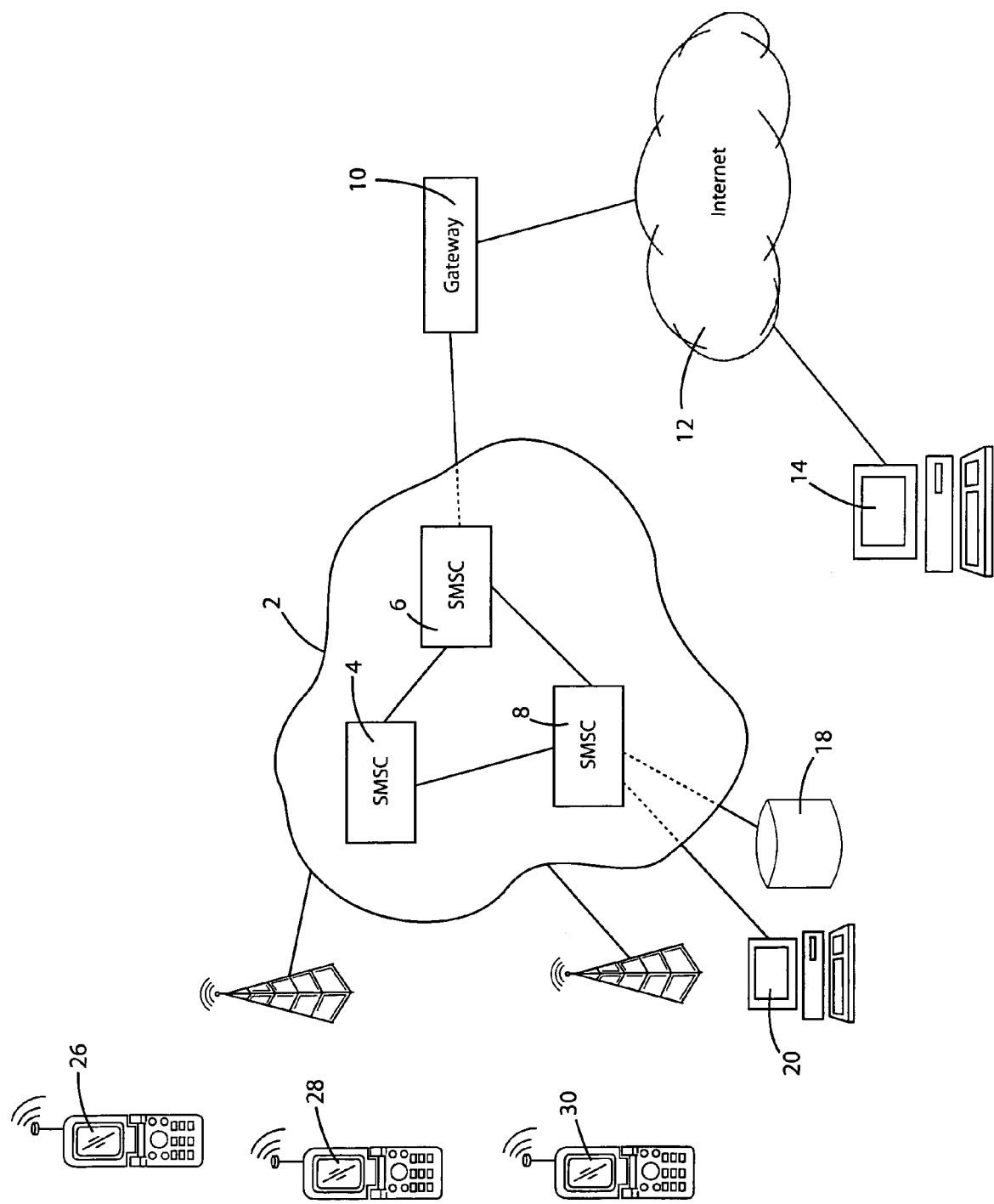
FIG. 1 illustrates in a block diagram of an embodiment of the system of the present invention.

With reference to FIG. 1, therein is shown a system in accordance with an illustrative embodiment of the present invention to prevent reception of spam messages by the intended recipient.

The system of FIG. 1 includes a wireless network 2 as known in the art, including all of the known components (not illustrated) of a wireless network, e.g., wireless switches, base stations, HLRs, VLRs, etc. An example of a wireless network is that owned and operated by Verizon Wireless®.

As shown in FIG. 1, wireless network 2 includes various short message service centers (SMSCs 4, 6, and 8) which together constitute part of an SMS network. SMSCs are known devices that receive, route and deliver SMS messages between and among SMS-capable end-unit devices, e.g., SMS-capable mobile telephones (26, 28 and 30). Known SMS-capable mobile phones include the Motorola® 270C, Nokia® 5185i, Kyocera® 2135. Also shown in FIG. 1 is an email/SMS gateway 10. Gateway 10 receives email and other wire-line based messages from a communications network, e.g., the Internet 12, and converts and forwards the messages to the SMS network for delivery to mobile telephones 26, 28 and 30. Gateway 10 is known in the art as an external short message entity (ESME). The protocol of choice for communicating between an ESME and an SMSC of the SMS network is the short message point-to-point protocol (SMPP), version 3.4, which is hereby incorporated herein by reference in its entirety.

Also shown in FIG. 1 is a terminal 14, which represents a personal computer or other Internet-based device that is capable of sending emails or other communications via the Internet 12 to Gateway 10 for eventual delivery to an SMS-capable mobile device. In FIG. 1, SMS-capable mobile devices communicate with the SMS network and receive SMS messages via wireless network 2 in the normal manner.

FIG. 1 further includes a database 18 containing telephone numbers associated with SMS spam messages and a management terminal connected to the SMS network via SMSC 8.

As will be explained in greater detail below, the various SMSCs of the SMS network are programmed to intercept packet data units (PDUs) containing SMS messages arriving from Gateway 10 and similar ESME devices and to inspect the PDUs for the presence of predetermined telephone numbers. A list of predetermined telephone numbers that have been identified as being associated with SMS spam messages is maintained by and periodically updated by a system administrator using management terminal 20 and stored as part of database 18. The system deletes any PDU containing any of the predetermined telephone numbers, thus effectively preventing delivery of the message.

Preferably, the SMSC that is connected to the relevant ESME, i.e., the first SMSC to receive the SMS message, performs the inspection and deletion process. Thus, in FIG. 1, SMSC 6 inspects PDUs arriving from gateway 10. In this manner, spam messages are identified and destroyed before they propagate further into the SMS network and consume additional network resources.

Figure 2:
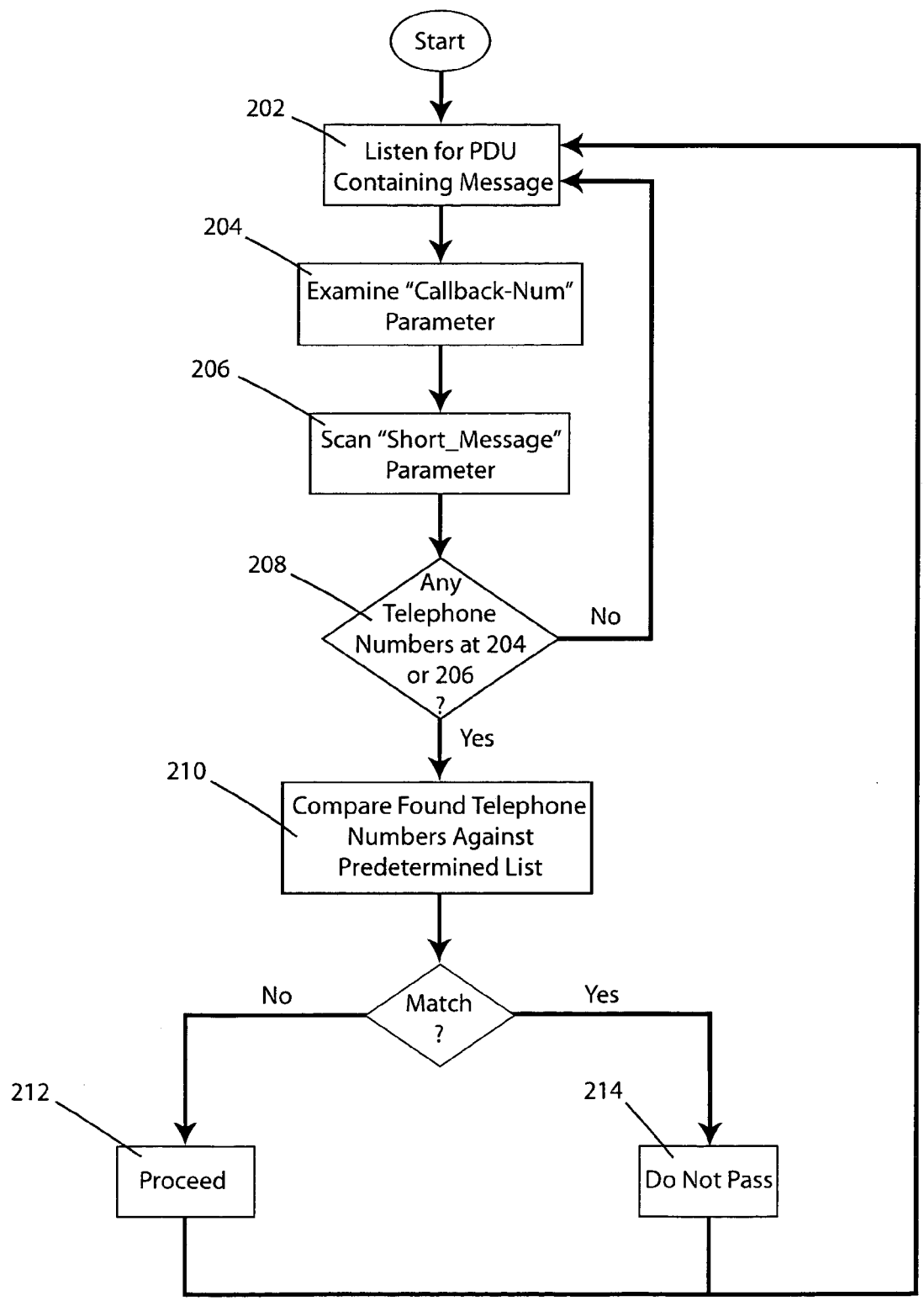
FIG. 2 illustrates an embodiment of the method of the present invention wherein both the text of an SMS message and the "callback_num" parameter are examined.
Figure 3:
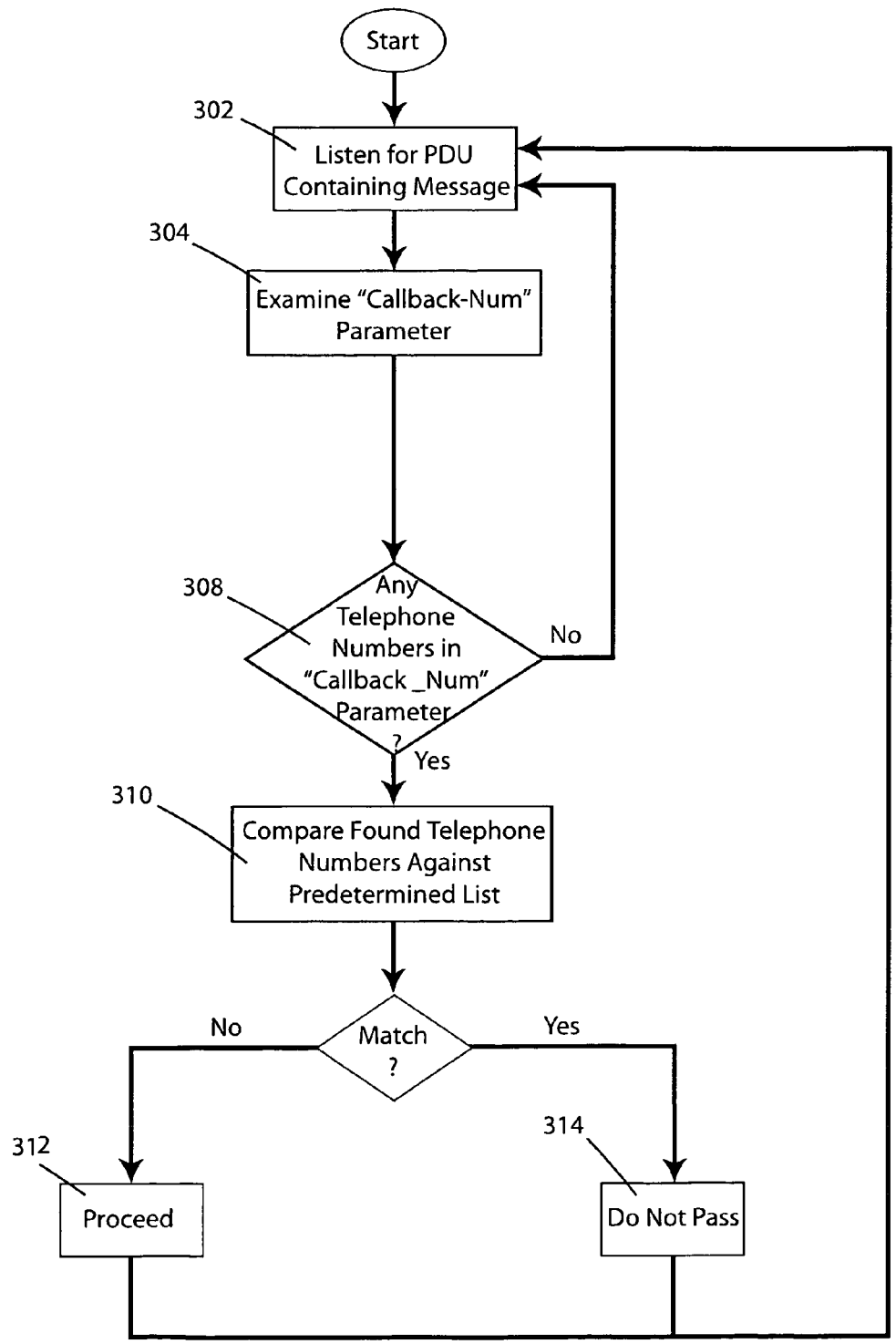
FIG. 3 illustrates an embodiment of the method of the present invention wherein the text of an SMS message is not examined.
Figure 4:
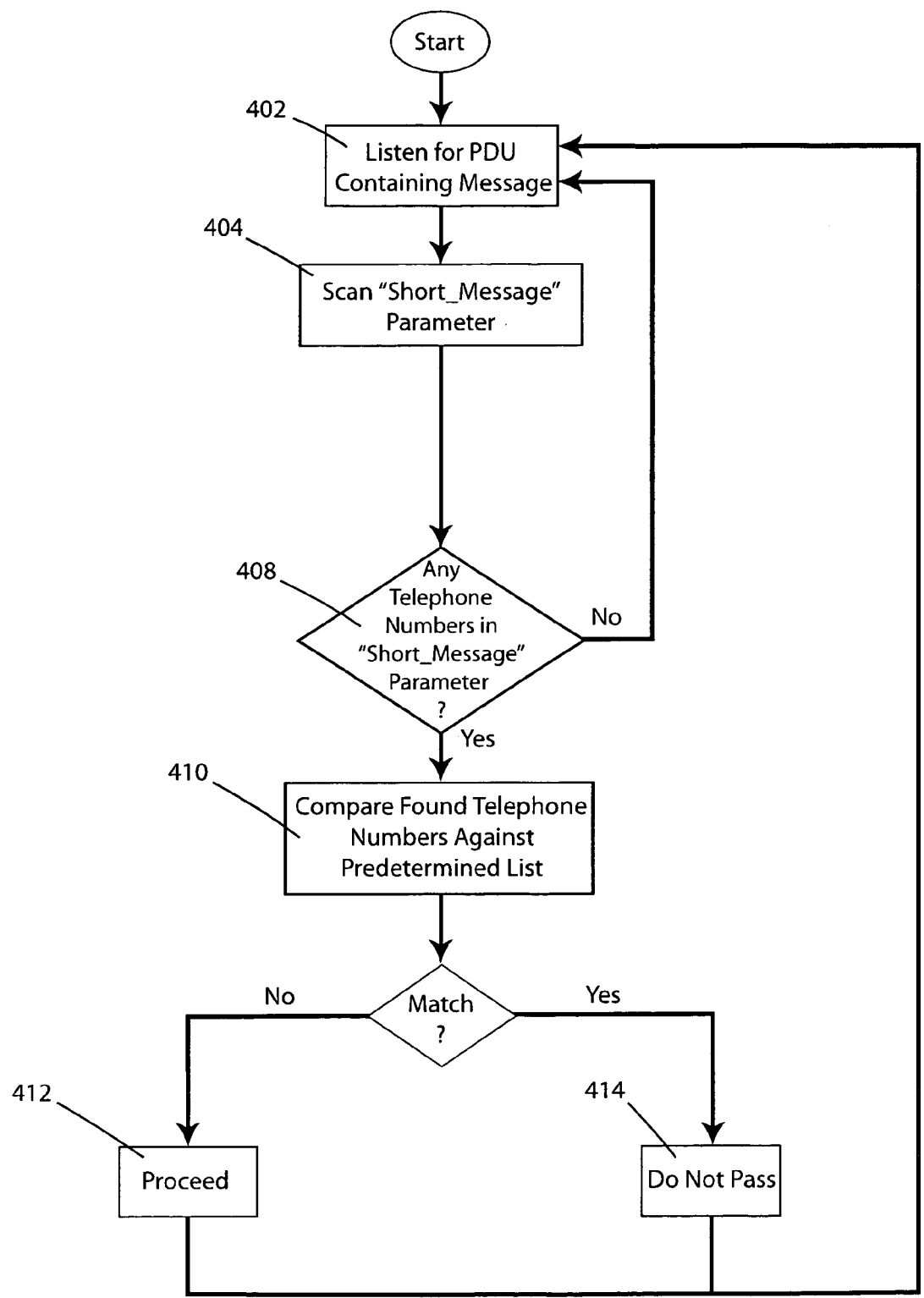
FIG. 4 illustrates an embodiment of the method of the present invention wherein the "callback_num" parameter is not examined.

Illustrative embodiments of an inspection and deletion process of the present invention are illustrated in flow chart form in FIGS. 2–4.

The methods described in FIGS. 2–4 may be implemented in the SMSCs of the SMS network illustrated in FIG. 1 as described above. The method requires that the SMSC be specially programmed to perform the operation described in FIG. 2. The required programming may be performed by one skilled in the art of programming SMSCs using conventional techniques.

Alternately, the processing described in FIGS. 2–4 may be performed by one or more additional preprogrammed microprocessor-based devices, e.g., a preprogrammed network server. In this latter case, upon reception from the ESME, the PDUs are first passed through the one or more additional microprocessor-based devices for inspection and deletion, as appropriate.

Preferably, regardless of where the processing occurs, the methods of FIGS. 2–4 operates in conjunction with those PDUs arriving from gateway 10 or like devices, i.e., ESMEs which send messages to the SMS network from internet-based mail and similar services. These ESMEs are the most likely source of spam messages in the SMS network. However, nothing in the present invention prevents operation of the method of FIG. 2 on any and all PDUs sent to the SMS network.

The database in the processes of FIGS. 2–4 refers to database 18 of FIG. 1 although one skilled in the art will appreciate that, although represented as a separate single physical entity, the functionality of database 18 may be spread among multiple databases or may be combined with any of the various SMSCs or various other devices and components of the SMS network.

In the process of FIG. 2, both the "callback-num" parameter and the text of the SMS message itself are inspected for telephone numbers associated with spam SMS messages.

With reference to FIG. 2, the process begins at step 202, where an SMSC—connected to an ESME and communicating with the ESME using SMPP—listens for submission of an SMS message. The SMSC examines the header of a PDU arriving from an ESME to determine if it is a "submit_sm" PDU. "Submit_sm" PDUs carry the text of an SMS message.

Upon determining that a received PDU is a "submit_sm" PDU, the system at step 204 examines the "callback_num" parameter of the "submit_sm" PDU to determine if a callback number has been provided.

Next at step 206, the system scans the "short_message" parameter of the "submit_sm" PDU, which contains the text of the actual short message, and attempts to find the presence of one or more telephone numbers in the text of the message. Any of the various known algorithms for searching text files for character strings having predetermined patterns may be utilized at step 206 for finding telephone numbers in the text of the SMS message. As an example, an algorithm for searching for seven or ten consecutive numbers or an algorithm for searching for a group of numbers separated by one or more space characters or dashes "-" may be utilized.

At step 208, the system determines if any telephone numbers were found at either step 204 or 206. If none were found, the system returns to step 202 and listens for the next incoming PDU.

If however, the system determines that at least one telephone number was found at either step 204 or 206, the system proceeds to step 210 where all of the telephone numbers found at steps 204 and 206 are compared against a list of predetermined telephone numbers stored in database 18. As discussed above, the list of predetermined telephone numbers represent telephone numbers known to the system administrator to be associated with the originators of spam messages.

If no match is found at step 210, the "submit_sm" PDU is determined to not contain a spam message and is therefore allowed to proceed (step 212) to its intended final destination via the SMS network. The process then returns to step 202.

If however any of the telephone numbers identified at steps 204 and 206 match any of the predetermined telephone numbers, the "submit_sm" PDU is not allowed to pass (step 214) to the intended destination by, e.g., deleting the PDU and related message. The system then preferably sends an error or equivalent message to the sender of the spam message informing the sender that the message has not been sent because it has been determined to be a spam message. Additionally, the system may also inform the intended receiver that an attempt was made to send a spam SMS message to the intended recipient. The system may also record the incident at database 18. In any event, after preventing delivery of the spam message at step 214, the process returns to step 202 to listen for the next PDU containing a message.

Variations in the process of FIG. 2 may be realized. The process of FIG. 3 is similar to that of FIG. 2 except that in the process of FIG. 3 only the "callback-num" parameter is examined for a telephone number relating to a spam SMS message. With reference to the flow chart diagram of FIG. 3, steps 302, 304, 308, 310, 312 and 314 generally correspond to steps 202, 204, 208, 210, 212 and 214 of FIG. 2. In the process of FIG. 3 however, there is no step corresponding to step 206 of FIG. 2, i.e., the step for examining the "short-message" parameter.

The process of FIG. 4 is also similar to that of FIG. 2 except that in the process of FIG. 4 only the "short-message" parameter is examined for a telephone number relating to a spam SMS message. With reference to the flow chart diagram of FIG. 4, steps 402, 406, 408, 410, 412 and 414 correspond to steps 202, 206, 208, 210, 212 and 214 of FIG. 2. In the process of FIG. 4 however there is no step corresponding to step 204, i.e. the step for examining the "callback-num" parameter.

The above-described illustrative embodiments of a system and method for preventing delivery of spam messages on a mobile communications network, such as an SMS network, is presented for illustrative purposes only. One skilled in the art will appreciate that variations in the present system and method may be achieved without departing from the sprit of the invention as defined by the claims which appear at the end of this patent. For example, the present system and method may be utilized to prevent delivery of spam messages over any type of wireless messaging network and is not necessarily limited to SMS networks.

I claim:

1. A method for preventing delivery of selected SMS messages, comprising the steps of:
   receiving a packet data unit (PDU) including an SMS message destined for an end user;
   determining that the received PDU is a "submit_sm" PDU;
   searching the "submit sm" PDU for one or more telephone numbers present in either the text of a "short_message" parameter or a "callback_num" parameter associated with the "submit_sm" PDU;
   comparing the one or more telephone numbers to a plurality of predetermined telephone numbers, and
   selectively preventing delivery of the SMS message to the end user if any of the one or more telephone numbers associated with the "submit_sm" PDU message matches any of the plurality of predefined telephone numbers.

2. The method of claim 1, wherein the searching step further comprises the step of:
   searching the "short_message" parameter of the "submit_sm" PDU for a plurality of numbers each having a predefined pattern.

3. The method of claim 1, wherein the searching step further includes the steps of:
   searching for the one or more telephone numbers in the "short_message" parameter; and
   searching for the one or more telephone numbers in the "callback_num" parameter.

4. The method of claim 2, wherein the predefined pattern includes one of a group of 7 consecutive numbers and a group of 10 consecutive numbers.

5. The method of claim 1, wherein the plurality of predefined telephone numbers are stored in a list and wherein the list is periodically updated.

6. The method of claim 1, wherein the preventing step further includes the step of deleting the SMS message.

7. The method of claim 1, including the further step of sending a message to the originator of the SMS message informing the sender that the SMS message has been deleted.

8. A system for preventing delivery of SMS messages, comprising:
   one or more network processing devices; and
   a list of predefined telephone numbers;
   the one or more network processing devices operative to:
      receive a packet data unit (PDU) from a sending device, the received PDU including an SMS message destined for an intended SMS receiving device;
      detecting that the received PDU is a "submit_sm" PDU including at least one of a "short_message" parameter and a "callback_num" parameter;
      extracting one or more telephone number distinct from a source identifier of a sender of the SMS message from either of the "short_message" parameter or the "callback_num" parameter;
      comparing the extracted one or more telephone numbers to the list of predefined telephone numbers; and
      selectively preventing delivery of the SMS message to the intended SMS receiving device if any of the one or more telephone numbers matches any of the telephone numbers in the list of predefined telephone numbers.

9. The system of claim 8, wherein the one or more network processing devices comprises a short message service center (SMSC).

10. The system of claim 8, wherein the one or more network processing devices comprises an SMSC and a database remote from the SMSC.

* * * * *

UNITED STATES PATENT AND TRADEMARK OFFICE
CERTIFICATE OF CORRECTION

PATENT NO. : 7,103,372 B1
APPLICATION NO. : 10/074585
DATED : September 5, 2006
INVENTOR(S) : Jerry Kupsh It is certified that error appears in the above-identified patent and that said Letters Patent is hereby corrected as shown below:

On Title page, Item (73)
In the Assignee:

Please delete "Cellco Partnership, Bedminister, NJ (US)" and substitute with

-- Cellco Partnership D/B/A Verizon Wireless, Bedminister, NJ (US) --.

Signed and Sealed this

Twenty-first Day of November, 2006

JON W. DUDAS
*Director of the United States Patent and Trademark Office*